3,130,189
HYDROXOCOBALAMIN-GLUTATHIONE
Edward J. Hanus, Palisade, N.J., Vincent J. Rizzo, Brooklyn, N.Y., and Helen R. Skeggs, Ardsley, Pa., assignors to Merck & Co., Inc., Rahway, N.J., a corporation of New Jersey
No Drawing. Filed Apr. 6, 1959, Ser. No. 804,144
1 Claim. (Cl. 260—112)

This invention relates to cobalamin compositions. More particularly it is concerned with hydroxocobalamin-peptide compounds, methods of preparing these compounds and compositions containing the compounds.

Vitamin B–12, which is also called cyanocobalamin, is known to be essential for erythrocyte maturation, and therapy with cyanocobalamin is indicated in anemias resulting from its improper absorption. Thus, in the treatment of pernicious anemia cyanocobalamin is administered parenterally by subcutaneous or intramuscular injection. For this purpose aqueous solutions of vitamin B–12 in suitable vehicles are used.

It is an object of the present invention to provide a modified cobalamin that can be retained in the body for longer periods. Another object is to provide methods of preparing such improved cobalamin products. A further object is to provide new pharmaceutical compositions containing this improved cobalamin product. Other objects will be apparent from the detailed description of this invention hereinafter provided.

In accordance with the present invention, it is now found that a cobalamin-peptide, hydroxocobalamin-glutathione, serves as a valuable source of cobalamin that is retained in the animal body when injected by parenteral routes for longer periods than is cyanocobalamin and possesses the unexpected advantage of being more readily absorbed when administered orally than is cyanocobalamin. The advantages of hydroxocobalamin-glutathione in promoting retention and absorption of vitamin B–12 activity extends the effectiveness of a given therapeutic dose.

In accordance with one embodiment of the present invention, it is now found that hydroxocobalamin-glutathione is conveniently prepared by combining hydroxocobalamin and glutathione in an aqueous solution and adding a suitable miscible solvent such as acetone whereupon the product precipitates in crystalline form and can be readily recovered, as for example by filtration. Thus, the product can be prepared in accordance with the following illustrative example:

Example

A solution of 400 mg. of hydroxocobalamin, 70 mg. of glutathione in 30 ml. of deionized water was heated to about 60° C. To this solution was added with stirring sufficient hot acetone to make the final volume about 250 ml. The resulting solution was allowed to cool to room temperature. After standing at room temperature for about six hours, the precipitated hydroxocobalamin-glutathione in the form of purple-red crystals was recovered by filtration, washed with acetone and air dried at room temperature for two hours. Biological and isotope dilution assays indicated the product containing one mol of hydroxocobalamin and one mol of glutathione to be at least 95% pure.

Hydroxocobalamin-glutathione prepared in accordance with this invention can be administered orally or by injection for use as a source of cobalamin activity in suitable dosage unit forms combined with pharmacologically acceptable carriers.

For oral administration the product can be administered in suitable dosage unit forms such as tablets or capsules containing suitable extenders and excipients which can be prepared in accordance with methods well known in this art. Similarly, for administration by injection hydroxocobalamin-glutathione can be incorporated in suitable solvents or solvent mixtures which may also contain preservatives and the like. Further, it can also be combined with other therapeutically active ingredients in suitable oral or injection forms pursuant to methods known in this art.

Hydroxocobalamin-glutathione will be present in such dosage unit forms in an amount ranging from about 1 to 2500 micrograms of cobalamin activity. For example, solutions containing amounts ranging from about 5 to 1500 micrograms of vitamin B–12 activity per milliliter are useful for injection purposes.

A comparison of the absorption of hydroxocobalamin-glutathione and cyanocobalamin was made in rats. These tests were carried out by administering labeled $Co^{58}$ hydroxocobalamin-glutathione and cyanocobalamin orally to rats and measuring the level of radioactivity in the liver and kidneys and the excretion of radioactivity in the urine which varies in proportion to the amount of the cobalamin absorbed. In these tracer absorption tests each compound was tested at levels equivalent to 20 to 200 millimicrograms of cyanocobalamin administered daily for ten days. The solutions of the cobalamin compounds were administered orally (0.5 ml. daily), and the urine of the animals was collected throughout the experiment. Twenty hours after administration of the final dose of the test samples, the animals were sacrificed and the total pooled urine, kidneys and livers assayed radiometrically. The results of these tests for individual rats expressed as "percent of dose" are shown in the following table:

| Group | Substance | Level, mcg./day | Rat | Percent of Dose | | |
|---|---|---|---|---|---|---|
| | | | | Kidney | Urine | Liver |
| I | Cyanocobalamin | 200 | 1 | 3.02 | 1.38 | 2.31 |
| | | | 2 | 2.11 | 1.17 | 2.03 |
| | | | 3 | 3.06 | 2.10 | 2.48 |
| | | | 4 | 3.42 | 0.86 | 3.19 |
| | | | 5 | 2.77 | 1.42 | 2.54 |
| Average | | | | 2.88 | 1.39 | 2.51 |
| II | Cyanocobalamin | 20 | 1 | 7.03 | 2.32 | 4.91 |
| | | | 2 | 4.58 | 1.54 | 4.38 |
| | | | 3 | 4.67 | 2.06 | 3.62 |
| | | | 4 | 5.27 | 1.22 | 4.59 |
| | | | 5 | 5.74 | 2.03 | 4.28 |
| Average | | | | 5.46 | 1.83 | 4.36 |
| III | Hydroxocobalamin-Glutathione.[1] | 200 | 1 | 1.64 | 3.57 | 2.15 |
| | | | 2 | 2.02 | 5.12 | 0.90 |
| | | | 3 | 2.29 | 4.93 | 1.90 |
| | | | 4 | 1.96 | 6.50 | 3.86 |
| | | | 5 | 2.20 | 4.50 | 2.92 |
| Average | | | | 2.02 | 4.92 | 2.35 |
| IV | Hydroxocobalamin-Glutathione.[1] | 20 | 1 | 2.57 | 7.55 | 4.06 |
| | | | 2 | 2.90 | 4.22 | 2.98 |
| | | | 3 | 2.44 | 8.50 | 3.09 |
| | | | 4 | 2.36 | 5.22 | 6.86 |
| | | | 5 | 2.49 | 7.60 | 3.58 |
| Average | | | | 2.55 | 6.62 | 4.11 |

[1] This concentration is of cyanocobalamin equivalent.

The above tabulated data indicate that much greater percentages of the orally administered doses of hydroxocobalamin-glutathione are excreted in the urine of the rat than are found after the administration of cyanocobalamin.

Another test in dogs demonstrated that hydroxocobalamin-glutathione prolonged the elevation of serum vitamin B–12 levels to a greater extent than did cyanocobalamin. In this test 0.5 ml. of an aqueous solution of hydroxocobalamin-glutathione containing the equivalent of one mg. of cyanocobalmin per ml. was injected into the gluteal muscle of each of two dogs. Similarly, 0.5 ml. of an aqueous solution containing 1 mg. of cyanocobalamin per ml. was administered to each of two other dogs. Venous blood was withdrawn from the dogs before the injection of the cobalamin solutions and at 5, 24, and 48 hours after injection and the serum levels of cobalamin activity determined in accordance with standard procedures with *L. leichmanii*. The results shown in the following table are the average serum vitamin B–12 levels for the two dogs in millimicrograms per ml. in blood samples drawn at the indicated intervals.

|  | Hydroxo-cobalamin-Glutathione | Cyano-cobalamin |
|---|---|---|
| 0 |  |  |
| 5 hours | 0.618 | 1.57 |
| 24 hours | 18.42 | 4.36 |
| 48 hours | 4.48 | 0.95 |
|  | 2.09 | 0.589 |

Thus, the above results clearly show that the administration of hydroxocobalamin-glutathione resulted in prolonged elevation of serum cobalamin levels compared to the values obtained with cyanocobalamin.

Various changes and modifications of the invention can be made and, to the extent that such variations incorporate the spirit of this invention, they are intended to be included within the scope of the appended claim.

What is claimed is:

The compound, hydroxocobalamin-glutathione, prepared by mixing equal molar quantities of glutathione and hydroxocobalamin in water, adding acetone to the water solution to precipitate the formed hydroxocobalamin-glutathione compound as purple-red crystals and recovering said purple-red crystals of hydroxocobalamin-glutathione.

References Cited in the file of this patent

UNITED STATES PATENTS

| 2,209,299 | Schoeller et al. | July 23, 1940 |
| 2,662,048 | Winsten | Dec. 8, 1953 |
| 2,748,054 | Jurist | May 29, 1956 |
| 2,861,026 | Martin | Nov. 18, 1958 |

OTHER REFERENCES

Wijmenga et al.: "Biochimica et Biophysica Acta," volume 6 (1950), pages 229–236.

Kaczka et al.: "Science," volume 112 (1950), pages 354–355.